United States Patent
Prieto et al.

(10) Patent No.: US 11,930,958 B2
(45) Date of Patent: Mar. 19, 2024

(54) HOT AIR FRYER COOKING APPLIANCE WITH A SCALABLE COOKING CAPACITY

(71) Applicant: SEB S.A., Ecully (FR)

(72) Inventors: Guillaume Prieto, Marsannay le Bois (FR); Jérémy Cornu, Lyons (FR)

(73) Assignee: SEB S.A. (FR)

(*) Notice: Subject to any disclaimer, the term of this patent is extended or adjusted under 35 U.S.C. 154(b) by 1080 days.

(21) Appl. No.: 16/359,302

(22) Filed: Mar. 20, 2019

(65) Prior Publication Data

US 2019/0290062 A1  Sep. 26, 2019

(30) Foreign Application Priority Data

Mar. 21, 2018 (FR) ...................... 1852455

(51) Int. Cl.
| | | |
|---|---|---|
| *A47J 37/06* | (2006.01) | |
| *A47J 37/10* | (2006.01) | |
| *A47J 45/06* | (2006.01) | |
| *A47J 45/07* | (2006.01) | |

(52) U.S. Cl.
CPC ......... *A47J 37/0641* (2013.01); *A47J 37/108* (2013.01); *A47J 45/061* (2013.01); *A47J 45/07* (2013.01)

(58) Field of Classification Search
CPC .... A47J 37/0641; A47J 37/108; A47J 45/061; A47J 45/07; A47J 45/06; A47J 37/0754; A47J 37/1295; A47J 37/1276; A47J 37/1209; A47J 37/12; A47J 27/04; A47J 36/16; A47J 2027/043
USPC .................. 99/331, 337, 403–418
See application file for complete search history.

(56) References Cited

U.S. PATENT DOCUMENTS

| | | | | | |
|---|---|---|---|---|---|
| 2,444,447 | A | * | 7/1948 | Josselyn | ............ B65D 25/2844 16/110.1 |
| 2,593,549 | A | * | 4/1952 | Finch | ...................... A47J 36/20 99/411 |
| 2,822,747 | A | * | 2/1958 | Schwaneke | ......... A47J 37/1209 99/411 |

(Continued)

FOREIGN PATENT DOCUMENTS

| | | | |
|---|---|---|---|
| CA | 2452634 | * | 6/2004 |
| CN | 204105798 | * | 1/2015 |

(Continued)

OTHER PUBLICATIONS

Translation CN204105798 (Year: 2022).*

(Continued)

*Primary Examiner* — Nathaniel E Wiehe
*Assistant Examiner* — Frederick F Calvetti
(74) *Attorney, Agent, or Firm* — Lerner David LLP

(57) ABSTRACT

A hot air fryer includes a main body, a vessel that can be removed from the main body and a basket that can be removed from the vessel. The fryer also includes a manipulating system having a configuration changing system that makes it possible to manipulate the vessel incorporating the basket at the same time, or to manipulate the basket alone, released and removed from the vessel, or to manipulate the vessel alone, released and removed from the basket, so as to allow a first mode of cooking foods in the basket incorporated in the vessel and a second mode of cooking foods directly in the vessel, the basket being extracted from the latter.

14 Claims, 7 Drawing Sheets

(56) References Cited

U.S. PATENT DOCUMENTS

| | | | | |
|---|---|---|---|---|
| 2,868,112 A * | 1/1959 | Bushway | ............ | A47J 37/1209 99/410 |
| 5,373,608 A * | 12/1994 | Welch | .................. | A47J 45/071 99/403 |
| 5,400,700 A * | 3/1995 | Bois | .................... | A47J 37/1209 99/410 |
| 5,441,169 A * | 8/1995 | Petty | ...................... | A47J 27/212 220/912 |
| 5,746,117 A * | 5/1998 | Chang | ................. | A47J 37/1219 99/413 |
| 5,803,307 A * | 9/1998 | Demetrio | ................ | A47J 37/10 220/756 |
| 5,992,308 A * | 11/1999 | Kroscher | ............. | A47J 27/002 D7/354 |
| 6,220,477 B1 * | 4/2001 | Schneider | ............ | A47J 45/061 220/757 |
| 6,237,471 B1 * | 5/2001 | Nam | ..................... | A47J 45/061 99/422 |
| 6,250,213 B1 * | 6/2001 | De'Longhi | ......... | A47J 37/1219 99/413 |
| 7,775,156 B2 * | 8/2010 | Sus | ..................... | A47J 37/1295 99/413 |
| 8,037,812 B1 * | 10/2011 | Sumner, Sr. | ........ | A47J 37/1295 99/413 |
| 8,267,277 B2 * | 9/2012 | Chameroy | ............ | A47J 45/062 220/763 |
| 8,322,564 B2 * | 12/2012 | Magnouloux | ......... | A47J 45/062 220/759 |
| 8,783,170 B2 * | 7/2014 | Mathey | ............... | A47J 37/1219 99/410 |
| 8,950,621 B2 * | 2/2015 | Hinzman | .............. | A47J 27/002 220/573.1 |
| 9,179,795 B1 * | 11/2015 | Lee | ....................... | A47J 27/002 |
| 10,016,092 B2 * | 7/2018 | Barrows | ............. | A47J 37/0629 |
| 11,033,146 B2 * | 6/2021 | Anthony | ............ | A47J 37/0623 |
| 11,134,808 B2 * | 10/2021 | Elliston | .................... | A47J 36/32 |
| 11,160,421 B2 * | 11/2021 | Prieto | ................. | A47J 37/1295 |
| 11,389,026 B2 * | 7/2022 | Martin | ................ | A47J 37/0664 |
| 2004/0112227 A1 * | 6/2004 | Dirand | ................ | A47J 37/1271 99/403 |
| 2004/0154474 A1 * | 8/2004 | Chan | .................. | A47J 37/1219 99/413 |
| 2005/0127063 A1 * | 6/2005 | Garziera | ............... | A47J 45/061 219/440 |
| 2008/0169281 A1 * | 7/2008 | Borovicka | .......... | A47J 37/1295 219/441 |
| 2008/0213447 A1 * | 9/2008 | Payen | ................. | A47J 37/0641 219/385 |
| 2011/0185917 A1 * | 8/2011 | Goderiaux | ............ | A47J 37/047 99/348 |
| 2014/0299049 A1 * | 10/2014 | Constantino, Jr. | ...... | A47J 43/22 118/19 |
| 2017/0231430 A1 * | 8/2017 | Moon | .................. | A47J 37/1266 99/331 |
| 2018/0035698 A1 * | 2/2018 | McNerney | ................ | A23L 5/17 |
| 2019/0290072 A1 * | 9/2019 | Prieto | ................. | A47J 37/1276 |
| 2019/0328179 A1 * | 10/2019 | Popeil | ..................... | A23L 13/50 |
| 2020/0405100 A1 * | 12/2020 | Bucklew | ............... | A47J 45/071 |
| 2021/0121011 A1 * | 4/2021 | Elliston | ............... | A47J 27/0804 |

FOREIGN PATENT DOCUMENTS

| | | | |
|---|---|---|---|
| CN | 204105798 U | | 1/2015 |
| CN | 204467868 | * | 7/2015 |
| CN | 105640363 | * | 6/2016 |
| CN | 109124312 | | 1/2019 |
| EP | 0 037 562 A1 | | 10/1981 |
| EP | 0037562 | * | 10/1981 |
| EP | 1426001 | * | 6/2004 |
| EP | 1428464 | * | 6/2004 |
| KR | 200309456 | * | 4/2003 |
| WO | WO2006/100367 | | 9/2006 |
| WO | WO2006100367 | * | 9/2006 |
| WO | WO 2012/123464 A1 | | 9/2012 |
| WO | WO2012123464 | * | 9/2012 |
| WO | WO2014095659 | * | 6/2014 |
| WO | WO 2014/198040 A1 | | 12/2014 |
| WO | WO2014198040 | * | 12/2014 |
| WO | WO2017085679 | * | 5/2017 |

OTHER PUBLICATIONS

Translation WO 2014198040 (Year: 2022).*
Review Philips air fryer (Year: 2017).*
Philips air fryer advertisement amazon (Year: 2021).*
Search Report as issued in French Patent Application No. 1852455, dated Nov. 14, 2018.

* cited by examiner

HOT AIR FRYER COOKING APPLIANCE WITH A SCALABLE COOKING CAPACITY

CROSS REFERENCE TO RELATED APPLICATIONS

This application claims priority to French Patent Application No. 1852455, filed Mar. 21, 2018, the entire content of which is incorporated herein by reference in its entirety.

FIELD

This invention concerns a hot air fryer cooking appliance. The invention aims in particular to make it possible to adapt the cooking capacity according to the quantity of foods to be cooked.

BACKGROUND

Hot air fryer cooking appliances are known to persons skilled in the art. Such appliances significantly reduce, or even completely eliminate, the quantity of fat used to cook foods of plant or animal origin, such as French fries, vegetables, meat or fish. In fact, the cooking takes place with little or no oil because of the hot air circulating in a vessel, making it possible to eat healthier foods that are crisp on the outside and soft on the inside. Since cooking oil is reduced or eliminated, these appliances release fewer odors and fat; in addition, they are easier to clean.

A hot air fryer cooking appliance generally comprises a vessel configured to receive a basket in which the foods to be cooked are arranged. Once the basket is positioned in the vessel and contains the foods, the cooking appliance can be closed to form a chamber which integrates the vessel integrating the basket with the foods. Hot air is then forced into this chamber using a hot air blowing system incorporated in the appliance. The forced hot air circulates in the chamber and in the vessel integrating the basket with the foods, thus cooking the foods. Once cooking is finished, the cooking appliance can be opened to extract the basket containing the cooked foods; a manipulating handle is secured to the basket so that it is possible to extract it from the vessel without burning oneself and to remove the cooked foods.

On certain models of hot air fryer cooking appliances, the vessel is removable from the body of the cooking appliance. We will mention, for example, the following models: Philips® HD9220/20 AirFryer®; Russell Hobbs® 20810-56; Aicok® AHF001. The vessel is inserted into the body and removed from the latter like a drawer. Inserting the vessel into the body permits closing the appliance and forming the chamber, integrating the vessel with the basket placed in the latter and containing the foods to be cooked. The basket is manipulated by means of its manipulating handle; when the basket is placed in the vessel, the manipulating handle is positioned outside the vessel. In addition, an assembly device allows securing the vessel with the basket placed inside the latter; in this way, the user can manipulate the vessel with the basket placed inside the latter by grasping the manipulating handle in order to insert them into the body of the cooking appliance or to remove them from the latter. At the end of cooking, the user pulls on the manipulating handle to remove the vessel with the basket from the body, then he actuates a control button allowing the deactivation of the assembly device, which makes it possible to extract the basket with the cooked foods from the vessel. The manipulation is done without risk of burning the user's hand.

On these various hot air fryer cooking appliance models, the basket has a defined capacity allowing it to receive a certain quantity of foods. When a larger quantity is necessary, a second cooking must then be carried out, which may last thirty minutes or longer, even though a small quantity of additional foods would have been sufficient. In addition, certain foods may be a bit too voluminous in relation to the basket's capacity, such as a chicken, which must be cooked differently, for example in an oven.

SUMMARY

An aspect of the invention implements a hot air fryer cooking appliance which allows increasing the cooking capacity of the appliance.

For this purpose, an embodiment of the invention concerns a hot air fryer cooking appliance which comprises a main body, a vessel that can be removed from the main body and a basket that can be removed from the vessel. According to an embodiment of the invention, the cooking appliance comprises a manipulating system having a configuration changing system that makes it possible to manipulate the vessel incorporating the basket at the same time, or to manipulate the basket alone, released and removed from the vessel, or to manipulate the vessel alone, released and removed from the basket, so as to allow a first mode of cooking foods in the basket incorporated in the vessel and a second mode of cooking foods directly in the vessel, the basket being extracted from the latter. In other words, the manipulating system makes it possible to modify the configuration of the cooking appliance in order to use the latter either as a traditional cooking appliance (first cooking mode), the cooking capacity being defined by the volume of the basket in which the foods to be cooked are placed, the basket, which may or may not be secured to the vessel, being manipulated through the use of the manipulating system without risk of burning oneself, or by increasing the cooking capacity (second cooking mode), the foods to be cooked then being placed directly in the vessel which can be manipulated easily without the basket by means of the manipulating system in order to be inserted into the body of the appliance and removed from the body once the foods are cooked, and without risk of burning oneself.

It will be appreciated that the cooking appliance according to an embodiment of the invention comprises other characteristics similar to traditional cooking appliances which allow the vessel to be inserted into the body and removed from the latter like a drawer. Inserting the vessel into the body—with or without the basket, through the use of the manipulating system—allows closing the appliance and forming a chamber, integrating the vessel—with or without the basket. A hot air blowing system incorporated in the appliance allows forcing hot air into this chamber; the forced hot air circulates in the chamber and in the vessel which may or may not contain the basket, thus cooking the foods placed in the vessel or in the basket.

According to a first design mode of the cooking appliance according to the invention, the manipulating system comprises a first manipulating handle arranged on the vessel and a second manipulating handle arranged on the basket. The manipulating system also comprises a removable assembly device arranged between the basket and the vessel in order to attach the basket to the vessel or to detach it from the latter. In addition, the first manipulating handle comprises an embedding area configured to at least partially receive the second manipulating handle when the basket is attached to the vessel and to allow simultaneous gripping of the first and second manipulating handles. Thus, when the basket is placed in the vessel, the assembly device ensures that they are secured and the first and second manipulating handles combine to form a single manipulating handle which the user grasps in order to engage the vessel with the basket containing the foods in the body of the cooking appliance and to remove them from the body at the end of cooking. Once these have been removed, the user grasps only the second manipulating handle and deactivates the assembly device to separate the basket from the vessel.

According to an embodiment of this first design mode of the cooking appliance, the assembly device comprises a body arranged behind the second manipulating handle, a receiving area arranged behind the first manipulating handle in order to receive the body when the basket is placed on the vessel and a locking system allowing the connection of the body housed in the receiving area. In an embodiment, the locking system comprises an opening arranged on the receiving area, a latch arranged on the body to engage in the opening and an actuating mechanism of the latch.

The front and back are defined on the cooking appliance by its facade which forms the front side. Thus, the vessel—with or without the basket—is inserted into the body of the cooking appliance through the facade by pushing from front to back. Conversely, the vessel—with or without the basket—is removed from the body by a movement from back to front, by pulling on the vessel.

According to an embodiment of the first design mode of the cooking appliance, the second manipulating handle is mounted with a pivoting connection on the body so as to move it to a position stowed in the embedding area or to a position released from the embedding area. This pivoting of the second manipulating handle facilitates grasping the handle in its released position in order to place the basket in the vessel and to remove it from the latter. However, other embodiments could be envisioned, for example with a second manipulating handle fixed with respect to the body but equipped with a gripping system that facilitates grasping it separately from the first manipulating handle in which the second manipulating handle is at least partially embedded.

According to the aforementioned embodiment, a locking mechanism makes it possible to keep the second manipulating handle in the released position. This locking makes it safe to use the basket. In addition, this locking facilitates shaking the basket to stir the foods, as well as turning the basket over to pour the cooked foods onto a dish.

According to this aforementioned embodiment, the second manipulating handle is arranged substantially parallel to a bottom of the basket, in the released position. This facilitates the manipulation of the basket, in particular when shaking the basket to mix the foods.

According to this aforementioned embodiment, the locking system is configured to be actuated by the second manipulating handle in the released position, this actuation allowing the body to be disconnected from the receiving area. Thus, the assembly device is automatically deactivated when the second manipulating handle is moved to its position released from the embedding area. This facilitates the manipulation of the cooking appliance. It will be appreciated that one could envision actuating the locking system independent of the released position of the second manipulating handle, for example by using a control button attached to this second manipulating handle or to the body arranged behind the latter.

According to a second design mode of the cooking appliance according to the invention, the manipulating system comprises a manipulating handle, a first removable assembly device arranged between the basket and the manipulating handle in order to place the manipulating handle on the basket or remove it from the latter, and a second removable assembly device arranged between the vessel and the manipulating handle in order to place the manipulating handle, whether or not it is assembled with the basket, on the vessel or to remove it from the latter. Thus, the manipulating system comprises only one manipulating handle which can be fixed to the basket alone, to the vessel alone or to the basket and the vessel at the same time.

According to an embodiment of this second design mode of the cooking appliance, the first removable assembly device comprises a support bracket arranged on the basket, a seating arranged on a body connected to the manipulating handle in order to receive the bracket and first locking system allowing the connection of the bracket housed in the body connected to the manipulating handle. In an embodiment, the first locking system comprises a striker arranged on the bracket, a bolt arranged on the body connected to the manipulating handle and an actuating mechanism of the bolt.

According to an embodiment of this second design mode of the cooking appliance, the second removable assembly device comprises a body connected to the manipulating handle, a receiving area arranged on the vessel in order to receive the body and second locking system allowing the connection of the body housed in the receiving area.

In an embodiment, the second locking system comprises an opening arranged on the receiving area, a latch arranged on the body and an actuating mechanism of the latch.

According to a design of the cooking appliance according to the invention, switching from the first cooking mode in the basket to the second cooking mode in the vessel allows the cooking capacity to be increased by approximately 30 to 60 percent.

BRIEF DESCRIPTION OF THE FIGURES

The following description highlights the characteristics and benefits of this invention. This description is supported by figures, among which.

DETAILED DESCRIPTION

In the following description, the same references are used to describe the identical or similar characteristics according to the various design variants of the hot air fryer cooking appliance.

The following description and the figures undertake to highlight the essential characteristics of embodiments of the invention which deal with the manipulating system of the basket and the vessel, taken individually or in combination, allowing the implementation of two food cooking modes with different capacities, one mode in the vessel alone and the other mode in the basket incorporated in the vessel. The other characteristics (hot air blowing system; body with chamber in which the vessel and the basket are inserted, etc.) of such a cooking appliance are already known, and therefore they are not detailed below. The person skilled in the art may refer to the hot air fryers already on the market, for example those specified previously.

FIGS. 1 to 6 show a first design of a basket 1, of a vessel 2 and of a manipulating system 3 between the basket 1 and the vessel 2.

Figure 1:
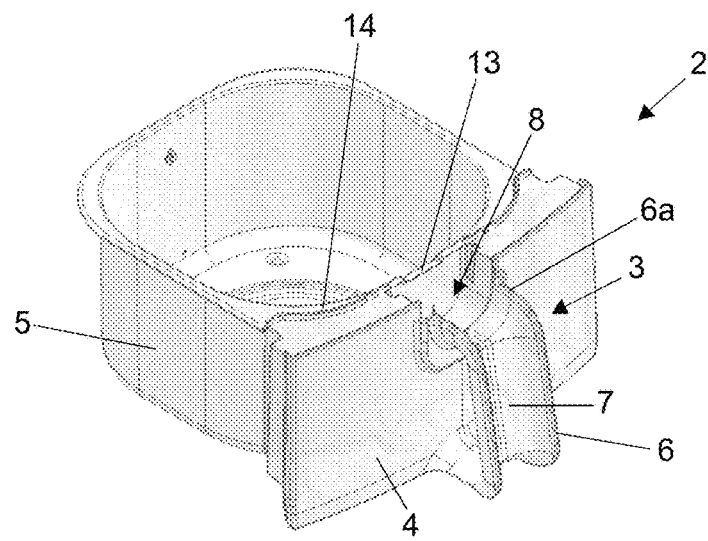
FIGS. 1 to 6 illustrate a first embodiment of the manipulating system on a hot air fryer cooking appliance according to the invention.

On FIG. 1, the vessel 2 is illustrated alone. This vessel 2 comprises a facade 4 arranged in front of a first container 5. On this facade 4 is arranged a first manipulating handle 6 which comprises an embedding area 7. The upper part 6a of the first manipulating handle 6 is extended toward the rear, within the thickness of the facade 4, by a receiving area 8.

Figure 2:
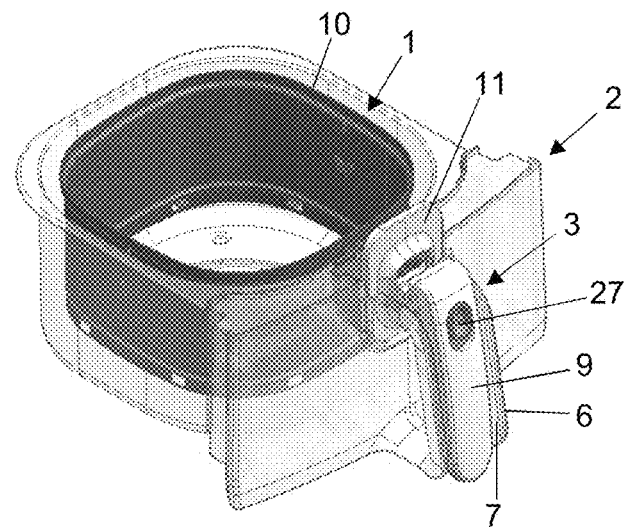
Figure 3:
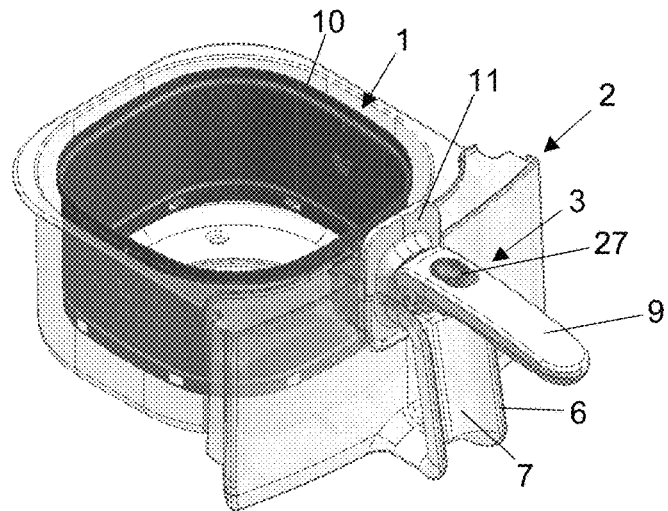
Figure 6:
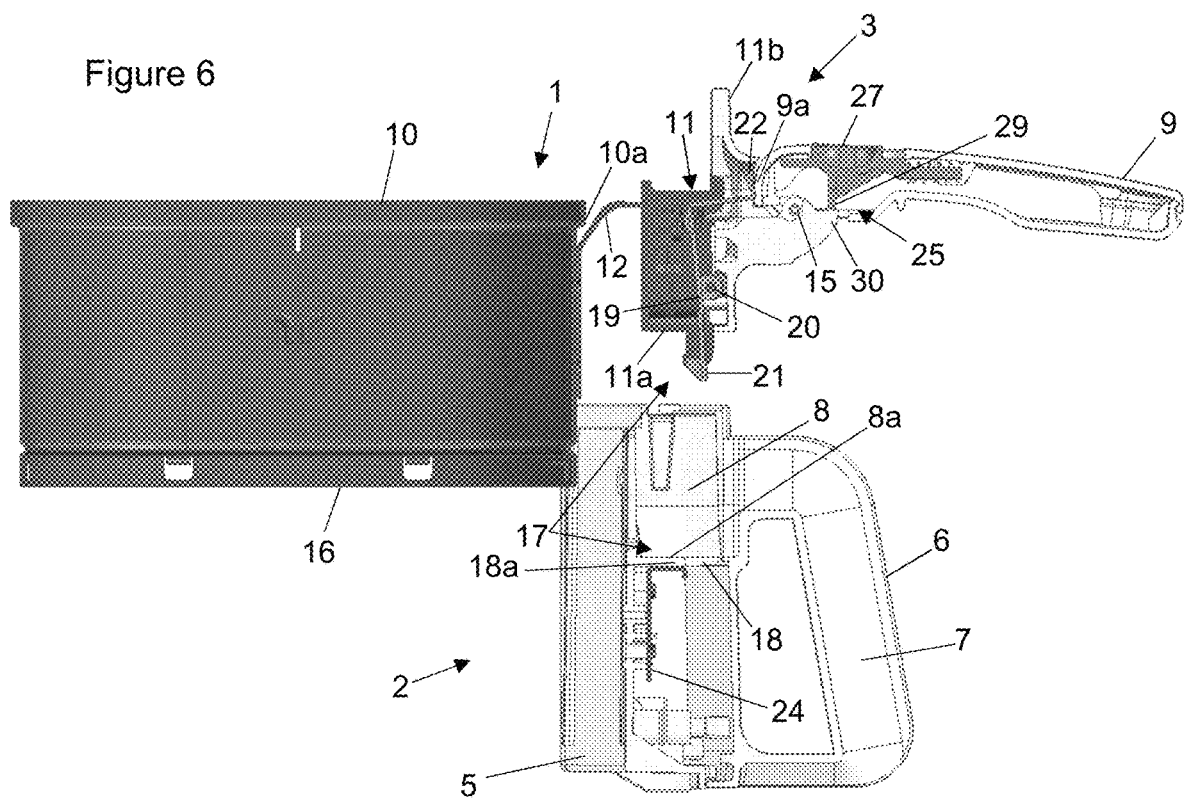

On FIGS. 2 and 3, the basket 1 is placed inside the vessel 2. The vessel 2 comprises a second manipulating handle 9 arranged in front of a second container 10. The second manipulating handle 9 is fixed to the front side 10a of the second container 10 by means of a body 11 and a support bracket 12, as illustrated by FIGS. 2, 3 and 6. When the basket 1 is placed in the vessel 2, the body 11 is housed in the receiving area 8 and the support bracket 12 rests against a notch 13 arranged on the upper edge 14 of the first container 5, opposite the receiving area 8.

Figure 4:
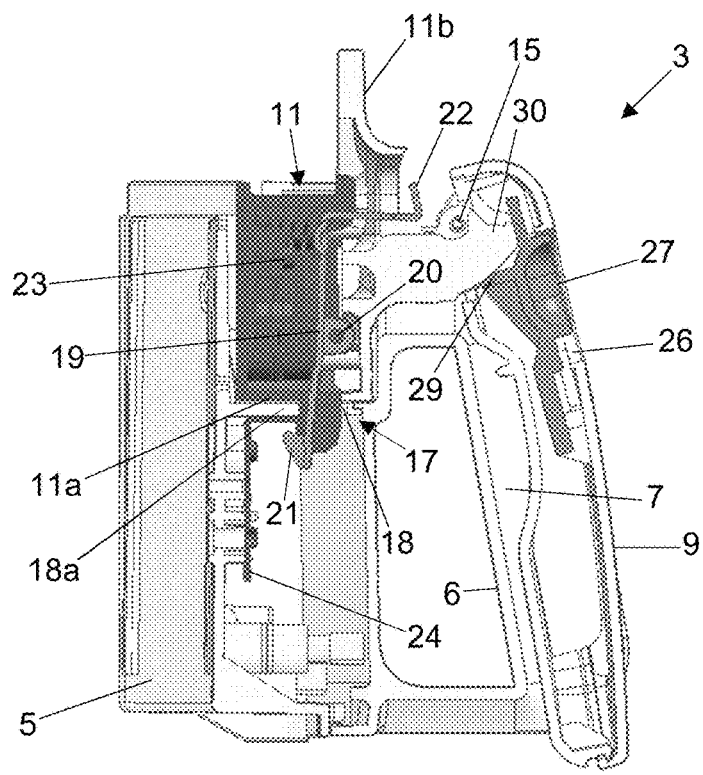
Figure 5:
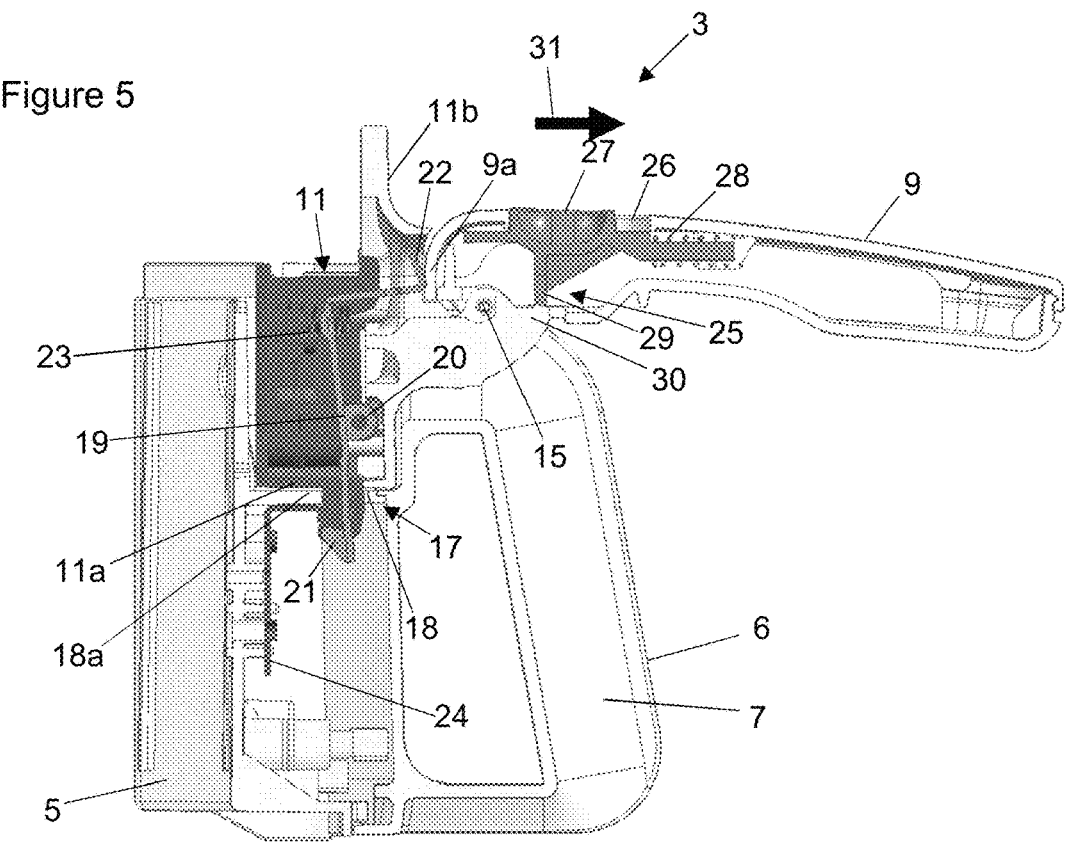

As illustrated in FIGS. 1 to 6, the second manipulating handle 9 is mounted with a pivoting connection 15 on the body 11 to pivot to a position stowed in the embedding area 7 (see FIGS. 2 and 4) or to a position released from the embedding area 7 (see FIGS. 3, 5 and 6). In this released position, the second manipulating handle 9 is positioned more or less parallel to the bottom 16 of the second container 10, in a configuration similar to that of a frying pan, to facilitate the shaking of the foods contained in the basket 1. In the stowed position, the second manipulating handle 9 is integrated in near-totality in the embedding area 7, which allows the first manipulating handle 6 and the second manipulating handle 9 to combine to form a single manipulating handle that can be grasped with one hand for manipulation of the vessel 2 with the basket 1 integrated and assembled with the vessel 2.

The assembly between the basket 1 and the vessel 2 is implemented by means of a removable assembly device 17, as illustrated in more detail in FIGS. 4 to 6. The receiving area 8 on the vessel 2 comprises in its lower part 8a an opening 18. The body 11 comprises a latch 19 which is mounted with a pivoting connection 20 inside the body 11. The latch 19 comprises at its lower end a head 21 forming a hook, the head 21 projecting from the lower face 11a of the body 11. Likewise, the latch 19 comprises at its upper end a curved finger 22 forming a support, the curved finger 22 projecting from the front face 11b of the body 11. This latch 19 is mounted in return by a spring 23 in order to be automatically returned to a normal position illustrated in FIG. 4 when the second manipulating handle 9 is stowed in the embedding area 7. When the body 11 is positioned in the receiving area 8, the head 21 of the latch 19 penetrates the opening 18 and is housed under a rear contour 18a of this opening 18, which allows the body 11 to be locked in the receiving area 8. A square reinforcing bracket 24 is placed under the rear contour 18a, under which the head 21 rests during the locking. When the second manipulating handle 9 is pivoted to its position released from the embedding area 7, an edge 9a of the second manipulating handle 9 rests against the curved finger 22, as illustrated in FIGS. 5 and 6, which causes the latch 19 to pivot and centers the head 21 in the axis of the opening 18, thus allowing the body 11 to be released from the receiving area 8. The basket 1 can thus be removed from the vessel 2, as shown in FIG. 6.

As illustrated in FIGS. 4 to 6, a locking mechanism 25 allows the second manipulating handle 9 to be kept in the position released from the embedding area 7. The second manipulating handle 9 comprises a window 26 in which a control button 27 is mounted in translation. This control button 27 is mounted in return by a spring 28 in an active position illustrated in FIGS. 5 and 6. The control button 27 comprises a stop finger 29 which rests against an edge 30 of the body 11, thus preventing the second manipulating handle 9 from pivoting in relation to the body 11. The translation of the control button 27 in the direction of an arrow 31 allows the stop finger 29 to be released from the edge 30, which allows the second manipulating handle 9 to pivot to the stowed position in the embedding area 7. The pivoting of the second manipulating handle 9 to the stowed position allows the head 21 of the latch 19 to be locked under the rear contour 18a of the opening 18, ensuring the assembly of the basket 1 with the vessel 2.

As shown in FIGS. 1 and 6, when the basket 1 is removed from the vessel 2, the first manipulating handle 6 can all the same be grasped with one hand, which allows the vessel to be manipulated individually, without any risk of burning oneself at the end of cooking. Thus, the user may choose to place foods in the second container 10 of the basket 1 which is then placed in the vessel 2 and then inserted with the vessel 2 into the cooking appliance. On the other hand, he can choose to place the foods in the first container 5 of the vessel 2 which is then inserted directly into the cooking appliance, without the basket 1.

FIGS. 7 to 14 illustrate a second design variant of the manipulating system 3 between the basket 1 and the vessel 2, achieving the same effects as the first design variant described above, namely, offering two cooking modes, one in the container and the other in the basket, in order to adapt the cooking capacity of the cooking appliance. On this second variant of FIGS. 7 to 14, we find a great number of characteristics identical to the first variant of FIGS. 1 to 6.

Figure 7:
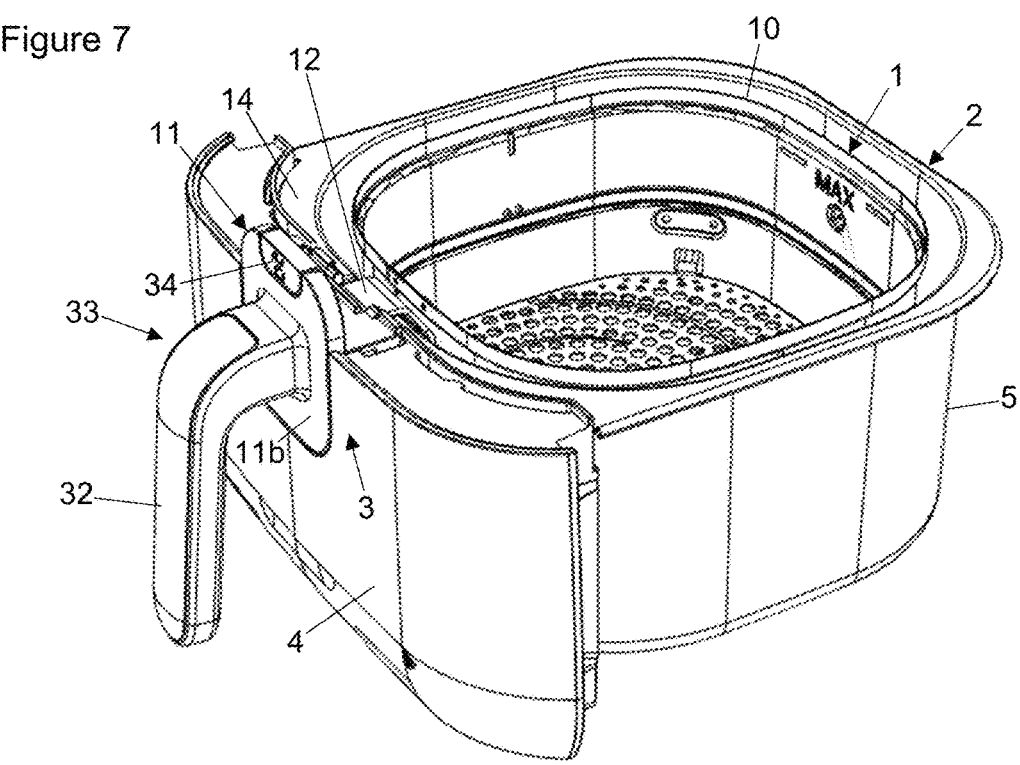
FIGS. 7 to 14 illustrate a second embodiment of the manipulating system on a hot fryer cooking appliance according to the invention.
Figure 8:
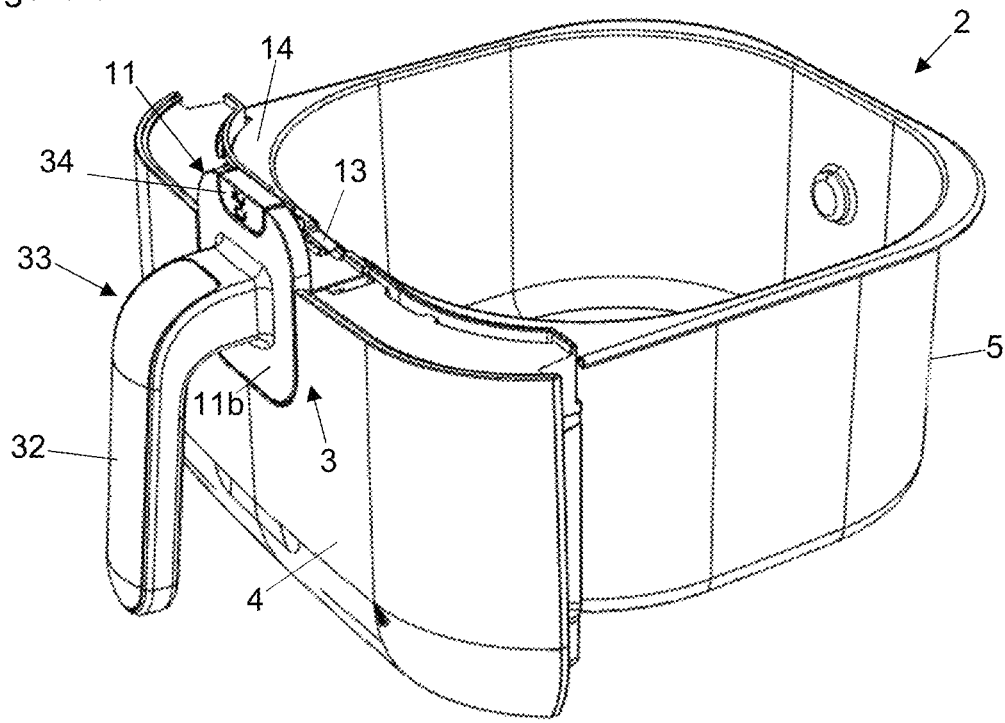
Figure 14:
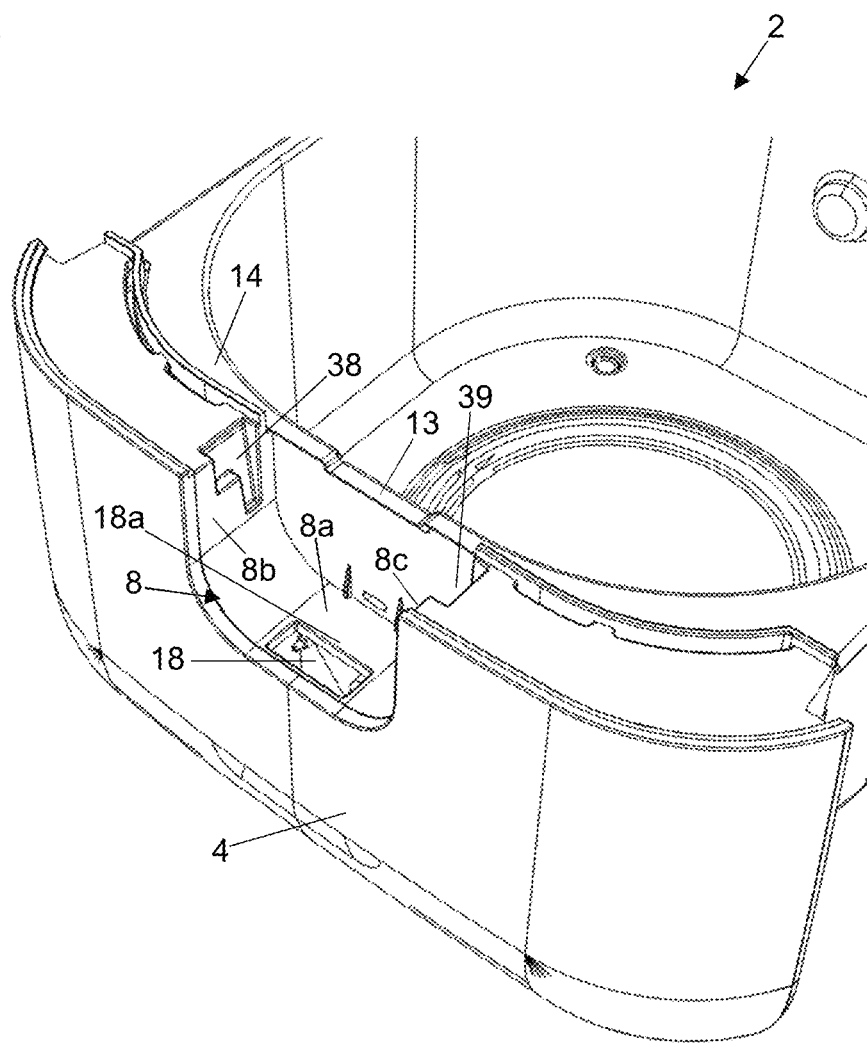

As illustrated in FIGS. 7, 8 and 14, the vessel 2 comprises a first container 5, a facade 4, a receiving area 8 equipped with an opening 18 and a notch 13 arranged on the upper edge 14 of the first container 5.

Figure 9:
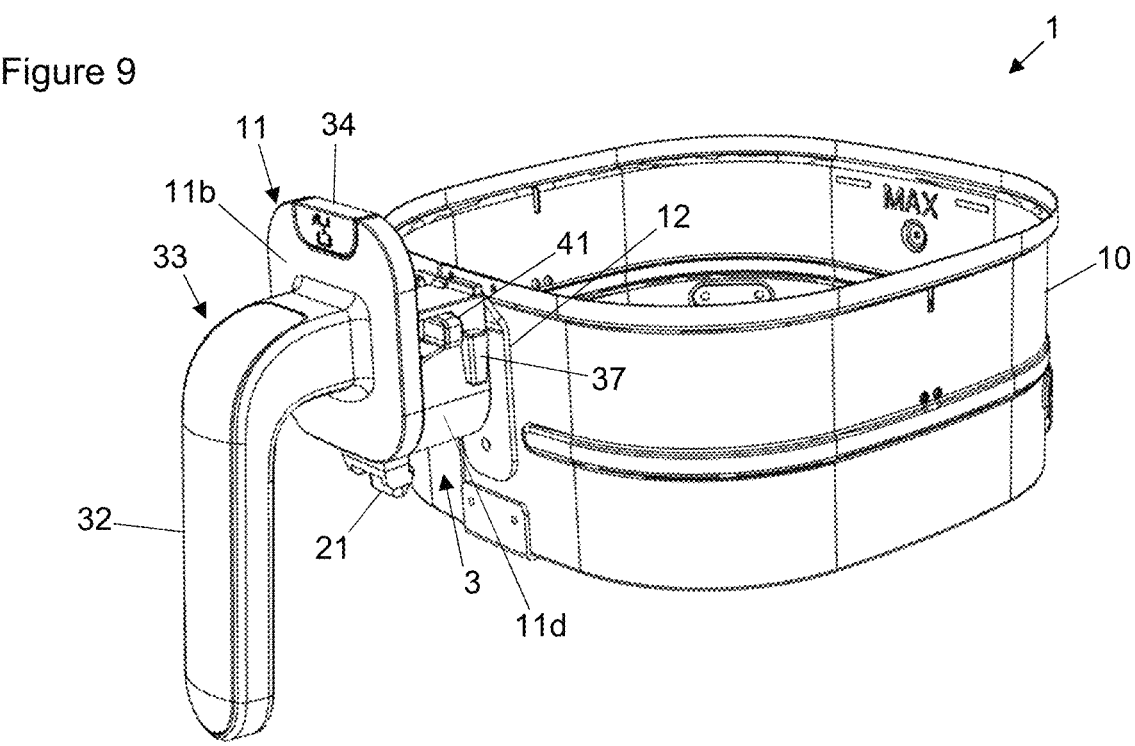
Figure 10:
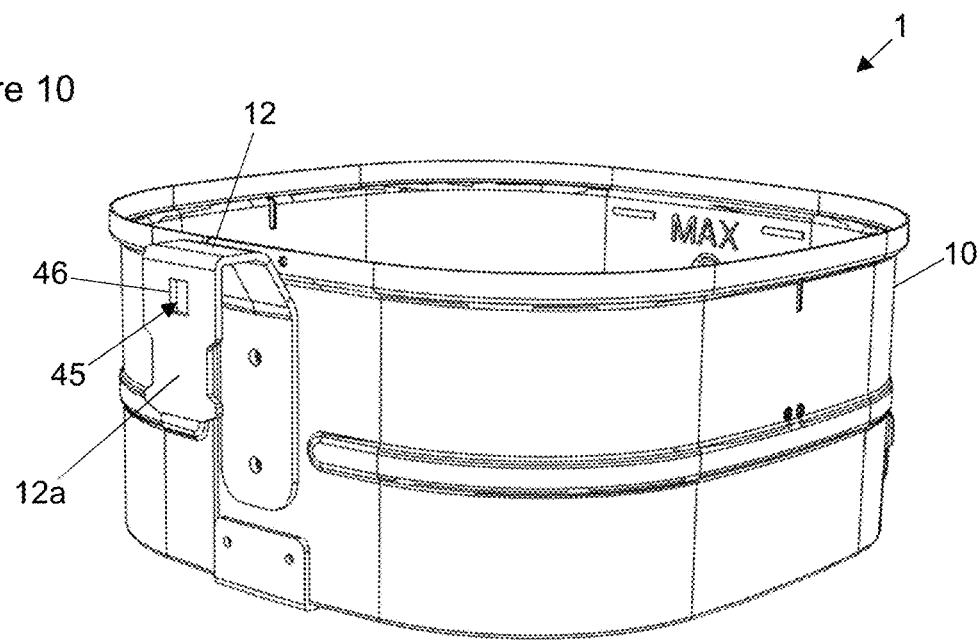

As illustrated in FIGS. 7, 9 and 10, the basket 1 comprises a second container 10, a body 11 and a support bracket 12 fixed to the front side 10a of the second container 10.

The manipulating system 3 implemented on this second variant of FIGS. 7 to 14 differs from the first variant of FIGS. 1 to 6 in that it provides a single manipulating handle 32, and not a first manipulating handle 6 and a second manipulating handle 9.

Figure 11:
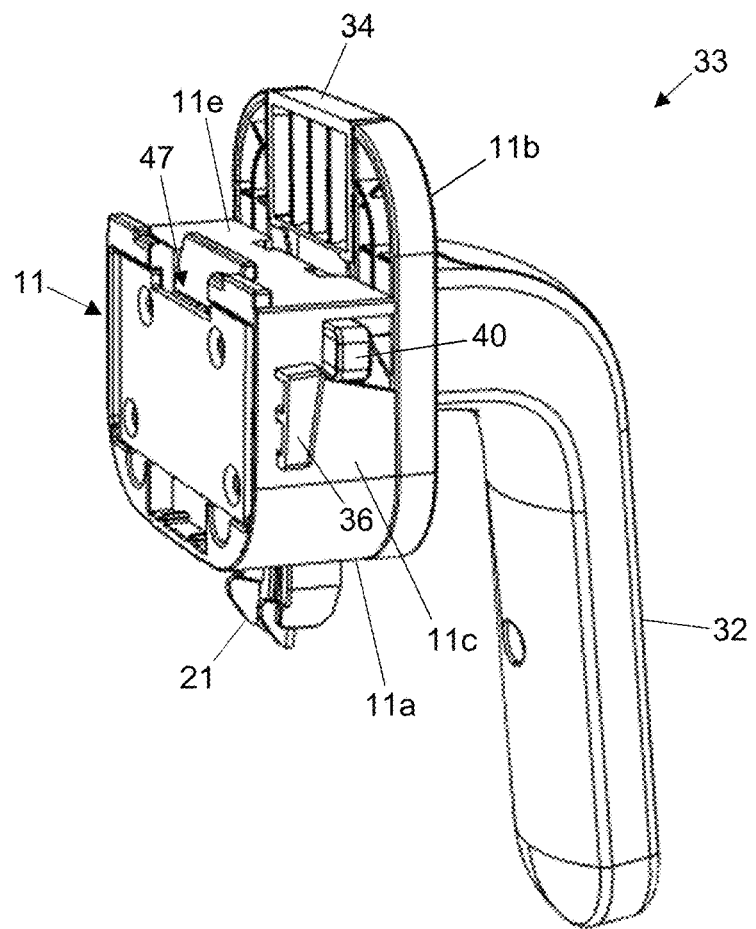
Figure 12:
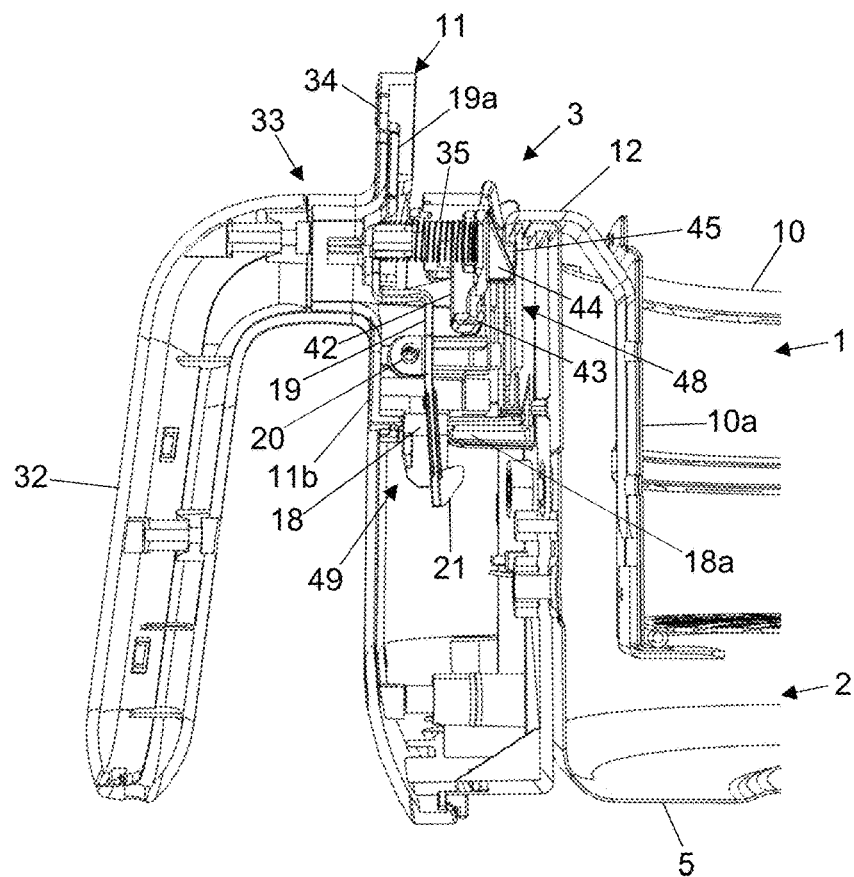
Figure 13:
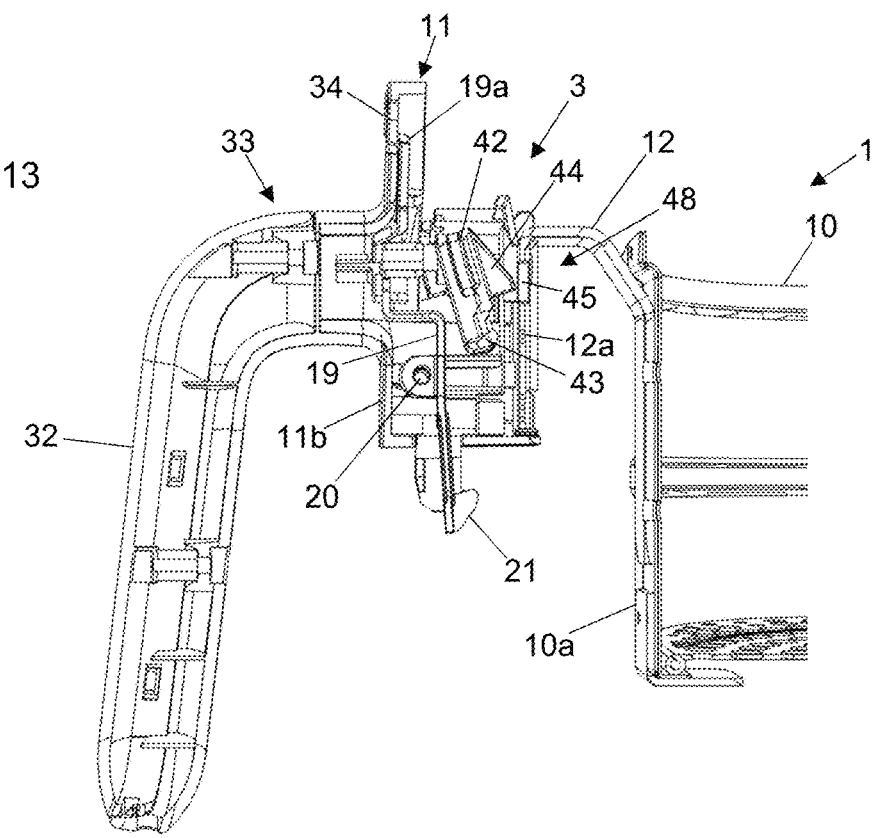

As illustrated in FIGS. 7 to 9 and 11 to 13, the manipulating handle 32 is fixed to the front face 11b of the body 11, the elements forming a single part 33 illustrated in FIG. 11. This part 33, integrating the manipulating handle 32, can be assembled simultaneously with the basket 1 and the vessel 2, as illustrated in FIGS. 7 and 12, or only with the basket 1, as illustrated in FIGS. 9 and 13, or only with the vessel 2, as illustrated in FIG. 8.

As previously for the first variant in FIGS. 1 to 6, according to this second variant in FIGS. 7 to 14, the body 11 integrates a latch 19 mounted with a pivoting connection 20 and comprises at its lower end a head 21 forming a hook. The upper end 19a of the latch 19 is fixed to a control button 34 accessible on the front face 11b of the body 11, as shown in FIGS. 7 to 9, 12 and 13. The actuation of the control button 34 allows the latch 19 to be pivoted in order to move the head 21 in the axis of the opening 18, thus allowing the body 11 to be removed from the receiving area 8. A spring 35 ensures that the latch 19 returns to the locking position, with the head 21 arranged under the rear contour 18a of the opening 18, as illustrated in FIG. 12, once the body 11 is inserted into the receiving area 8 and the control button 34 is released. Two fingers 36, 37 are arranged on the lateral sides 11c, 11d of the body 11, as illustrated in FIGS. 9 and 11. These fingers 36, 37 are positioned in guide notches 38, 39 arranged on the lateral sides 8b, 8c of the receiving area 8; when the fingers 36, 37 are housed in the notches 38, 39, the body 11 is blocked in translation from front to back with respect to the receiving area 8.

As illustrated in FIGS. 9 and 10, the part 33 comprising the body 11 and the manipulating handle 32 may be detached from the support bracket 12 fixed to the second container 10. For this purpose, as illustrated in FIGS. 11 to 13, the body 11 comprises on its lateral sides 11c, 11d two triggers 40, 41 which are projecting and formed by means of a single actuating part 42 mounted with a pivoting connection 43 on the body 11. This actuating part 42 comprises a bolt 44. The support bracket 12 comprises a striker 45 formed by an orifice 46 on a curved part 12a arranged in front of the support bracket 12, as illustrated in FIG. 10. The body 11 comprises on its upper face 11e a seating 47, illustrated in FIG. 11, into which the curved part 12a of the support bracket 12 is able to penetrate. When the curved part 12a of the support bracket 12 is inserted into the seating 47, the bolt 44 of the actuating part 42 engages in the striker 45, which locks the part 33 with the support bracket 12 and the second container 10, thus forming the basket 1 equipped with the manipulating handle 32. The activation of one or the other of the triggers 40, 41 allows releasing the bolt 44 from the striker 45, as shown in FIG. 13, thus allowing the extraction of the curved part 12a of the support bracket 12 outside the part 33. The return of the bolt 44 to an active position illustrated in FIG. 12 is ensured by the spring 35.

Thus, the part 33 can be assembled with the second container 10 of the basket 1 through the use of a first removable assembly device 48 implemented by means of the actuating part 42 in the body 11 which comprises the bolt 44, of the curved part 12a of the support bracket 12 which comprises the striker 45, the bolt 44 mounted in return by a spring 35 and the striker 45 ensuring the locking of the body 11 with the support bracket 12. Likewise, the part 33 can be assembled with the first container 5 of the vessel 2 through the use of a second removable assembly device 49 implemented by means of the body 11 incorporating the latch 19 and of the receiving area 8 comprising the opening 18, the head 21 of the latch 19 and the rear contour 18a of the opening 18 ensuring the locking of the body 11 in the receiving area 8. Through the use of these two assembly devices 48, 49, the part 33 may be assembled with the basket 1 alone, with the vessel 2 alone and with the basket 1 and the vessel 2 at the same time.

The above description highlights aspects of the invention. This description is not restrictive in nature, variants being possible without departing from the context of the invention.

For example, another variant could be envisioned, in which the control button 34 illustrated on the second variant in FIGS. 7 to 14 would be arranged in an identical manner on the first variant in FIGS. 1 to 6. In this case, the actuation of the first manipulating handle 6 in the position released from the embedding area 7 would have no impact on the unlocking between the body 11 and the receiving area 8.

In an embodiment, the first container 5 on the vessel can hold 4.5 liters and allows 1.2 kg of foods to be cooked, and the second container 10 on the basket 1 can hold 2.2 liters and allows 800 g of foods to be cooked, which allows a 50 percent increase in the cooking capacity. These holding capacities could be varied in order to increase the cooking capacity by approximately 30 to 60 percent.

The invention claimed is:

1. A hot air fryer cooking appliance comprising:
a main body;
a vessel that is removable from the main body and having a first cooking volume configured to accommodate a first quantity of food;
a basket that is removable from the vessel and having a second cooking volume smaller than the first cooking volume and configured to accommodate a second quantity of food less than the first quantity of food, and
a manipulating system having a configuration changing system that is adapted to manipulate the vessel incorporating the basket at the same time, or to manipulate the basket alone, released and removed from the vessel, or to manipulate the vessel alone, released and removed from the basket, so as to allow a first mode of cooking foods in the basket incorporated in the vessel, thereby using the second cooking volume, and a second mode of cooking foods directly in the vessel, the basket being extracted from the vessel, the vessel configured to be manipulated via the manipulating system without the basket, thereby using the first cooking volume.

2. The hot air fryer cooking appliance according to claim 1, wherein the manipulating system comprises a first manipulating handle arranged on the vessel and a second manipulating handle arranged on the basket, and a removable assembly device arranged between the basket and the vessel in order to attach the basket to the vessel or to detach the basket from the vessel the first manipulating handle comprising an embedding area configured to at least partially receive the second manipulating handle when the basket is attached to the vessel and to allow simultaneous gripping of the first and second manipulating handles.

3. The hot air fryer cooking appliance according to claim 2, wherein the removable assembly device comprises a body arranged behind the second manipulating handle, a receiving area arranged behind the first manipulating handle in order to receive the body when the basket is placed on the vessel and a locking system allowing the connection of the body housed in the receiving area.

4. The hot air fryer cooking appliance according to claim 3, wherein the locking system comprises an opening arranged on the receiving area, a latch arranged on the body to engage in the opening and an actuating mechanism of the latch.

5. The hot air fryer cooking appliance according to claim 3, wherein the second manipulating handle is mounted with a pivoting connection on the body so as to move it to a position stowed in the embedding area or to a position released from the embedding area.

6. The hot air fryer cooking appliance according to claim 5, further comprising a locking mechanism adapted to keep the second manipulating handle in the released position.

7. The hot air fryer cooking appliance according to claim 5, wherein the second manipulating handle is arranged substantially parallel to a bottom of the basket, in the released position.

8. The hot air fryer cooking appliance according to claim 5, wherein the locking system is configured to be actuated by the second manipulating handle in the released position, the actuation allowing the body to be disconnected from the receiving area.

9. The hot air fryer cooking appliance according to claim 1, wherein the manipulating system comprises a manipulating handle, a first removable assembly device arranged between the basket and the manipulating handle in order to place the manipulating handle on the basket or remove it from the latter, and a second removable assembly device arranged between the vessel and the manipulating handle in order to place the manipulating handle, whether or not it is assembled with the basket, on the vessel or to remove it from the latter.

10. The hot air fryer cooking appliance according to claim 9, wherein the first removable assembly device comprises a support bracket arranged on the basket, a seating arranged on a body connected to the manipulating handle in order to receive the bracket and a first locking system allowing the connection of the bracket housed in the body connected to the manipulating handle.

11. The hot air fryer cooking appliance according to claim 10, wherein the first locking system comprises a striker arranged on the bracket, a bolt arranged on the body connected to the manipulating handle and an actuating mechanism of the bolt.

12. The hot air fryer cooking appliance according to claim 9, wherein the second removable assembly device comprises a body connected to the manipulating handle, a receiving area arranged on the vessel in order to receive the body and a second locking system allowing the connection of the body housed in the receiving area.

13. The hot air fryer cooking appliance according to claim 12, wherein the second locking system comprises an opening arranged on the receiving area, a latch arranged on the body and an actuating mechanism of the latch.

14. The hot air fryer cooking appliance according to claim 1, wherein a switch from the first cooking mode in the basket to the second cooking mode in the vessel allows the cooking capacity to be increased by approximately 30 to 60 percent.

* * * * *